June 27, 1961 A. C. MUNSTER 2,990,515
MULTIPLE SIGNAL DELAY DEVICE
Filed Dec. 13, 1946
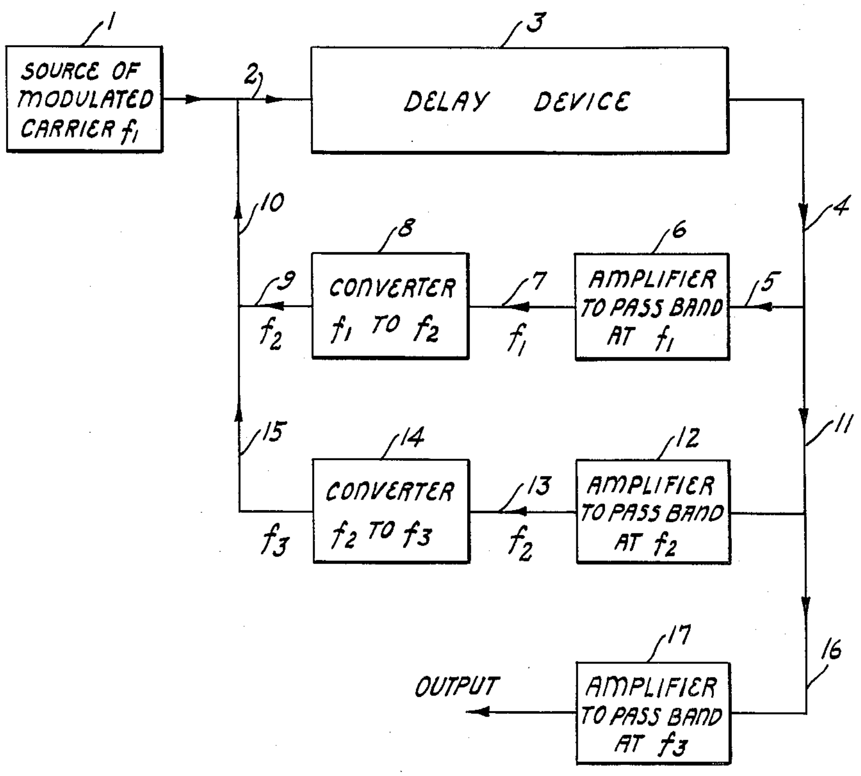
INVENTOR.
ALLEN C. MUNSTER
BY
Brown, Denk & Synnestvedt
AGENTS United States Patent Office 2,990,515
Patented June 27, 1961

2,990,515

MULTIPLE SIGNAL DELAY DEVICE

Allen C. Munster, Philadelphia, Pa., assignor to Philco Corporation, Philadelphia, Pa., a corporation of Pennsylvania Filed Dec. 13, 1946, Ser. No. 716,004
9 Claims. (Cl. 328—177)

This invention relates to electrical signal delay systems. More particularly it relates to methods of and means for utilizing a conventional signal delay device to provide a greater amount of delay than is normally obtainable when the device is used in the conventional manner. The invention is generally applicable in the fields of communication and radar and has particular usefulness in radar object motion indicator systems of the so-called storage type, in which reflections from a target object are delayed in time and subsequently compared with later reflections from the same object. Differences between successive reflections provide an indication that the object has moved in the interim.

Delay devices of the sort to which the invention is applicable are of numerous forms. One, for example, is the well-known artificial transmission line comprising an electrical network composed of discrete impedance elements. In its usual form such a line comprises a plurality of serially connected inductive elements and a plurality of shunt-connected capacitive elements forming a recurrent network. Another form of delay device consists of a confined column of a medium (e.g. mercury) having a relatively low velocity of propagation, together with means for propagating waves in the medium and means for detecting them at a later time at a point remote from the point of propagation. Other delay devices to which the invention is applicable are readily conceivable, but the examples mentioned are deemed sufficient to indicate the breadth of such application.

The amount of delay obtainable from a device of the sort above referred to is limited by the attenuation inherent therein, which is a function of the magnitude of the delay. Therefore it is unfeasible to construct such a device having an inherent delay in excess of a predetermined maximum for any particular application. It is, of course, possible to use a plurality of such delay devices and to provide amplification between them, whereby the effect of attenuation is counteracted and large delays are obtainable, but at the expense of using considerable equipment. The present invention provides means for obtaining relatively large delays while using a considerably smaller amount of equipment for the purpose than has heretofore been possible.

Briefly, according to the invention, the signal to be delayed is first caused to modulate a carrier wave of predetermined frequency. The resultant signal is supplied to the input of a conventional delay device, and a delayed signal corresponding in frequency and modulation to the input signal is derived from the output of the delay device. The delayed signal is then modified by shifting its carrier frequency without affecting its modulation. The new modulated carrier wave signal is then supplied to the input of the identical delay device, and, because it differs in frequency from the original modulated carrier wave signal, passes through the delay device without undesirable interaction with the original signal. Thus, at the output of the delay device will now appear a signal at the new carrier frequency having substantially the same modulation as the original signal but delayed by an amount equal to the time required for a signal to pass twice through the delay device. If further delay is desired, this output signal may again be altered by shifting its carrier to a third frequency different from the first two but having substantially the same modulation as the delayed original signal, and this signal may, in turn, be passed through the delay device. This process may be repeated as many times as is necessary to obtain the desired delay, subject only to the limitation imposed by the bandwidth of the delay device, the bandwidth of the signal to be delayed and the requirement that a new frequency band must be occupied by the modulated carrier signal following each shift in its carrier wave frequency. Following each transit of the signal through the delay device, and preferably prior to the shifting of the carrier to a new frequency, the signal may be amplified to counteract the effect of attenuation introduced in the course of its passage through the delay device.

Accordingly, the principal objects of the invention may be stated as follows:

(1) To provide a method of and means for obtaining large delays of electrical signals while using a minimum of equipment, (2) To provide methods of and means whereby a delay device of conventional form may be used simultaneously to delay a plurality of different electrical signals, without causing undesirable interaction between the signals and without otherwise appreciably modifying their characteristics, and (3) To provide methods of and means for repeatedly passing a signal through the same delay device to obtain, ultimately, a signal corresponding substantially in all other significant respects to the original signal, but cumulatively delayed by an amount equal to the product of the inherent delay of the device multiplied by the number of times the signal is passed therethrough.

Other objects and advantages of the invention will become apparent from a consideration of the following detailed description with reference to the single figure which illustrates diagramatically a typical embodiment of the invention.

Referring to the figure, block 1 represents a source of an electrical wave signal comprising a carrier of substantially fixed frequency $f_1$ modulated by an intelligence signal of relatively lower frequency which is to be delayed in time. This modulated carrier wave signal is supplied through connection 2 to delay device 3 which may, for example, be of one of the forms hereinbefore mentioned. It is appropriate to point out, however, that the magnitude of the delay of the original signal supplied from source 1, which is obtainable in accordance with the method of the invention, is directly limited by the bandwidth of the delay device. It has been found that, for a given bulk of equipment comprising the delay device, the mechanical form (comprising, for example, a column of mercury with means for propagating waves therein and means for later detecting the propagated waves at a point in the mercury remote from the point of propagation) provides a greater bandwidth than is obtainable by the use of an electrical delay device consisting, for example, of an artificial transmission line. However, this statement should not be regarded as excluding the use of a purely electrical delay device in certain applications where it may be found more advantageous for other reasons.

From the output of delay device 3 is derived a signal which is substantially identical in carrier frequency and modulation to the original signal supplied to its input from source 1. This signal, however, will have been delayed in time by an amount determined by the characteristics of the particular delay device used. The delayed signal is supplied through connections 4 and 5 to the input circuit of an amplifier 6, which is adapted to counteract the effect of attenuation of the signal in the course of its passage through delay device 3. Also, amplifier 6 should include a band-pass filter adapted to pass substantially unattenuated the frequency components comprising the original modulated carrier wave signal supplied from source 1, but to reject frequencies corresponding to the output of delay device 3 which result from the passage therethrough of signals at other carrier frequencies. The output of amplifier 6, at the carrier frequency $f_1$, is then supplied through connection 7 to converter 8 which is adapted to modify the amplified signal by converting it to a new carrier frequency $f_2$ such that the frequency components of the new modulated carrier wave signal will lie in a band outside that occupied by the components of the original signal from source 1. This converter may, for example, comprise a local oscillator and a conventional mixer tube, to separate elements of which are applied the local oscillator signal and the modulated carrier wave signal supplied through connection 7. As is well known, this mixing operation will yield heterodyne signals at frequencies equal to the sum and difference of the local oscillator frequency and the original carrier frequency $f_1$. Therefore converter 8 should also include a suitable filter in its output circuit for eliminating one of these heterodyne components.

The resultant signal at the new carrier frequency $f_2$ is supplied through connections 9, 10 and 2 to the input of delay device 3. Because the components of this signal have been made to lie outside the band occupied by the components of the original modulated carrier wave signal from source 1, there will be no interaction between the two signals which pass simultaneously through delay device 3. A delayed signal of carrier frequency $f_2$, but corresponding in all other material respects to the original signal from source 1, is derived from the output of delay device 3. Thus the original signal from source 1 has been shifted in carrier frequency to the frequency $f_2$, and has been delayed in time by an amount equal to twice the delay introduced by passing the signal once through delay device 3.

If further delay is desired, this output signal may be supplied through connection 11 to the input circuit of a second amplifier 12, which is adapted to counteract the attenuation experienced in the delay device and which is provided with a band-pass filter for selecting only those frequencies in the output of delay device 3 which correspond to the components of the modulated carrier wave signal whose carrier frequency is $f_2$. The amplified signal is supplied through connection 13 to a second converter 14 which converts the modulated carrier wave of frequency $f_2$ to a new modulated carrier wave of frequency $f_3$ differing from both $f_1$ and $f_2$ and comprising modulation components in a band exclusive of those occupied by the original modulated carrier wave signal from source 1 and the output from converter 8 at carrier frequency $f_2$. Like converter 8, converter 14 may comprise a conventional local oscillator and mixer circuit, together with a filter for selecting either the sum or the difference heterodyne frequency. The modulated output from converter 14 at carrier frequency $f_3$ is supplied through connections 15, 10 and 2 to the input of delay device 3, from the output of which is derived a triply-delayed signal of carrier frequency $f_3$. To separate this signal from the others present in the output of delay device 3, and to restore the signal to a suitable amplitude level, there may be provided a band-pass amplifier adapted to pass the carrier wave of frequency $f_3$ and its modulation components supplied thereto through connection 16. Because, in general, the modulation of the original carrier wave of frequency $f_1$ by the intelligence signal is but a means to an end, it will be desirable to provide means for demodulating the ultimate delayed modulated carrier wave signal derived from the output of amplifier 17. Such means may be of any well known form and, for this reason, are not here illustrated.

Obviously this process of shifting the carrier frequency of the output signal from delay device 3 and supplying the resultant signal to the input of the delay device for further delay might be repeated many more times to obtain a cumulative delay of the desired magnitude. As already pointed out, the only limitation on this is imposed by the bandwidth of the delay device as compared with the band of frequencies comprising the original signal, but since it is quite feasible to provide a delay device of considerable bandwidth the method is a very useful one for obtaining unusually long delays. Thus, in general, the total delay obtainable will be equal to the fraction, whose numerator is the product of the bandwidth of the delay device multiplied by the delay experienced by a signal passing once through the delay device, and whose denominator is the bandwidth of the original signal.

It will be apparent from a consideration of the arrangement just described that it will be desirable to include buffer tubes in the outputs of both converters 8 and 14, as well as in the output of source 1, to prevent undesirable reaction on these devices by the signals present in the system which differ in frequency from their respective outputs. Thus, for example, such a buffer stage included in the output of converter 8 would prevent the modulated carrier wave of frequency $f_1$ from source 1 and the modulated carrier wave of frequency $f_2$ from converter 14 from affecting the operation of converter 8. Also, it will be apparent that it is unnecessary that all of the signals be passed through delay device 3 in the same direction. Thus, for example, if the delay device employed is capable of operating bilaterally (as in the case of an artificial line) the modulated carrier wave of frequency $f_1$ from source 1 might be passed through the delay device from left to right, the delayed and shifted signal of carrier frequency $f_2$ might be passed through the device in reverse direction from right to left, etc. Various other modifications of this sort, to the embodiment of the invention shown and described, will occur to those skilled in the art. Hence it will be understood that the invention is not limited in scope to the particular embodiment here shown, but only by the appended claims.

I claim:

1. In a signal delay system, a source of an electrical wave signal of predetermined frequency, a delay device, means for supplying said signal to said delay device to be delayed, means for deriving from said delay device a signal which is a delayed version of said original wave signal, means for altering the frequency of said delayed signal, means for supplying said altered signal to said delay device to be delayed, and means for deriving from said delay device a signal which is a delayed version of said altered signal.

2. In a signal delay system, a source of a signal to be delayed, said signal comprising frequency components having predetermined characteristics and lying principally within a predetermined band, a delay device, means for supplying said signal to said delay device to be delayed, means for deriving from said delay device a signal which is a delayed version of said original signal, means responsive to said delayed signal for producing a signal comprising frequency components having at least certain of the characteristics of said first-named components and lying principally in a band exclusive of said first-named band, means for supplying said produced signal to said delay device to be delayed, and means for deriving from said delay device a signal which is a delayed version of said produced signal.

3. In a signal delay system, a signal delay device, means for supplying to said device a signal to be delayed, said signal comprising a carrier signal of predetermined frequency modulated by an intelligence signal, means for deriving from said device a signal which is a delayed version of said first-named signal, means responsive to said delayed signal for producing a signal comprising a carrier signal of frequency different from said first-named carrier and modulated substantially in accordance with the modulation of said delayed signal, means for supplying said produced signal to said device to be delayed, and means for deriving from said delay device a signal which is a delayed version of said produced signal.

4. In a signal delay system, a signal delay device having input and output terminals, means for supplying to said input terminal a signal to be delayed, said signal comprising a carrier signal of predetermined frequency modulated by an intelligence signal, means for deriving from said output terminal a signal which is a delayed version of said first-named signal, means responsive to said delayed signal for producing a signal comprising a carrier signal of frequency different from said first-named carrier and modulated substantially in accordance with the modulation of said delayed signal, means for supplying said produced signal to the input terminal of said delay device to be delayed, and means for deriving from the output terminal of said delay device a signal which is a delayed version of said produced signal.

5. In a signal delay system, a delay device having a predetermined bandwidth, a pair of band-pass filters each adapted to pass a different frequency band within the bandwidth of said delay device, a source of a wave signal having a frequency within one of said pass bands, means for supplying said signal to said delay device to be delayed, means including one of said filters for deriving a delayed version of said signal from said delay device, means for shifting the frequency of said derived signal into the pass band of said other filter, means for supplying said shifted frequency signal to said delay device to be delayed, and means including said other filter for deriving from said delay device a delayed version of said shifted frequency signal.

6. In a signal delay system, a source of an electrical wave signal of predetermined frequency, a delay device, means for supplying said signal to said delay device to be delayed, means for deriving from said delay device a signal which is a delayed version of said original wave signal, means for amplifying and for altering the frequency of said delayed signal, means for supplying said altered signal to said delay device to be delayed, and means for deriving from said delay device a delayed version of said altered signal.

7. The method of delaying an electrical signal which comprises passing said signal through a delay device, altering the frequency of the signal thus delayed, and passing said altered signal through the same delay device.

8. The method of delaying a signal comprising a carrier signal modulated by an intelligence signal, which comprises passing the signal through a delay device, altering the carrier frequency of the signal thus delayed, and passing the altered signal through the same delay device.

9. The method of delaying a signal comprising a carrier signal modulated by an intelligence signal, which comprises successively passing the signal through a delay device and altering the frequency of said carrier prior to each repassage through said device.

References Cited in the file of this patent

UNITED STATES PATENTS

| | | |
|---|---|---|
| 1,770,143 | Pickard | July 8, 1930 |
| 1,775,775 | Nyquist | Sept. 16, 1930 |
| 1,985,683 | Nicolson | June 25, 1934 |
| 2,055,992 | Yolles | Sept. 29, 1936 |
| 2,212,173 | Wheeler et al. | Aug. 20, 1940 |
| 2,421,026 | Hall | May 27, 1947 |